US012596586B2

(12) United States Patent (10) Patent No.: US 12,596,586 B2
Fahlbusch et al. (45) Date of Patent: Apr. 7, 2026

(54) MANAGING STATE OF DISTRIBUTED CLOUD ENVIRONMENT IN PEER-TO-PEER NETWORK

(71) Applicant: SAP SE, Walldorf (DE)

(72) Inventors: Jannick Stephan Fahlbusch, Berlin (DE); Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 611 days.

(21) Appl. No.: 17/983,816

(22) Filed: Nov. 9, 2022

(65) Prior Publication Data

US 2024/0152403 A1 May 9, 2024

(51) Int. Cl.
*G06F 9/50* (2006.01)
(52) U.S. Cl.
CPC .......... *G06F 9/5072* (2013.01); *G06F 9/5016* (2013.01); *G06F 2209/505* (2013.01)
(58) Field of Classification Search
CPC .................................................... G06F 9/5072
See application file for complete search history.

(56) References Cited

U.S. PATENT DOCUMENTS

| | | | | |
|---|---|---|---|---|
| 11,520,770 | B2 * | 12/2022 | Vosshall | G06F 16/27 |
| 2014/0164335 | A1 * | 6/2014 | Gnech | G06F 11/1458 |
| | | | | 707/654 |

| | | | | |
|---|---|---|---|---|
| 2020/0244464 | A1 * | 7/2020 | McLean | H04L 9/0618 |
| 2022/0214995 | A1 * | 7/2022 | Wu | G06F 16/182 |
| 2023/0367887 | A1 * | 11/2023 | Dande | G06F 21/6254 |
| 2024/0031151 | A1 * | 1/2024 | Zeng | G06Q 10/06 |

OTHER PUBLICATIONS

Z. Zheng, S. Xie, H. Dai, X. Chen and H. Wang, "An Overview of Blockchain Technology: Architecture, Consensus, and Future Trends," 2017 IEEE International Congress on Big Data (BigData Congress), Honolulu, HI, USA, 2017, pp. 557-564, doi: 10.1109/BigDataCongress. 2017.85. (Year: 2017).*

* cited by examiner

*Primary Examiner* — Charlie Sun
(74) *Attorney, Agent, or Firm* — SCHWEGMAN LUNDBERG & WOESSNER, P.A.

(57) ABSTRACT

In an example embodiment, rather than use a traditional database or datastore, or an ETCD database, to store the state of a cloud infrastructure management and orchestration system, a peer-to-peer network is used. The complete state of the cluster is available at every node. Nodes that are newly added to the system will fetch the current state from existing nodes. If the verification of the block is successfully performed by at least a quorum of the nodes, then the block is persisted as a new state on a node, and then distributed as a new state to every other node. The verification ensures that errors or possibly compromised nodes cannot persist incorrect changes to the system state.

20 Claims, 9 Drawing Sheets

MANAGING STATE OF DISTRIBUTED CLOUD ENVIRONMENT IN PEER-TO-PEER NETWORK

TECHNICAL FIELD

This document generally relates to distributed cloud environments. More specifically, this document relates to the managing of the state of distributed cloud environments in a peer-to-peer network.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
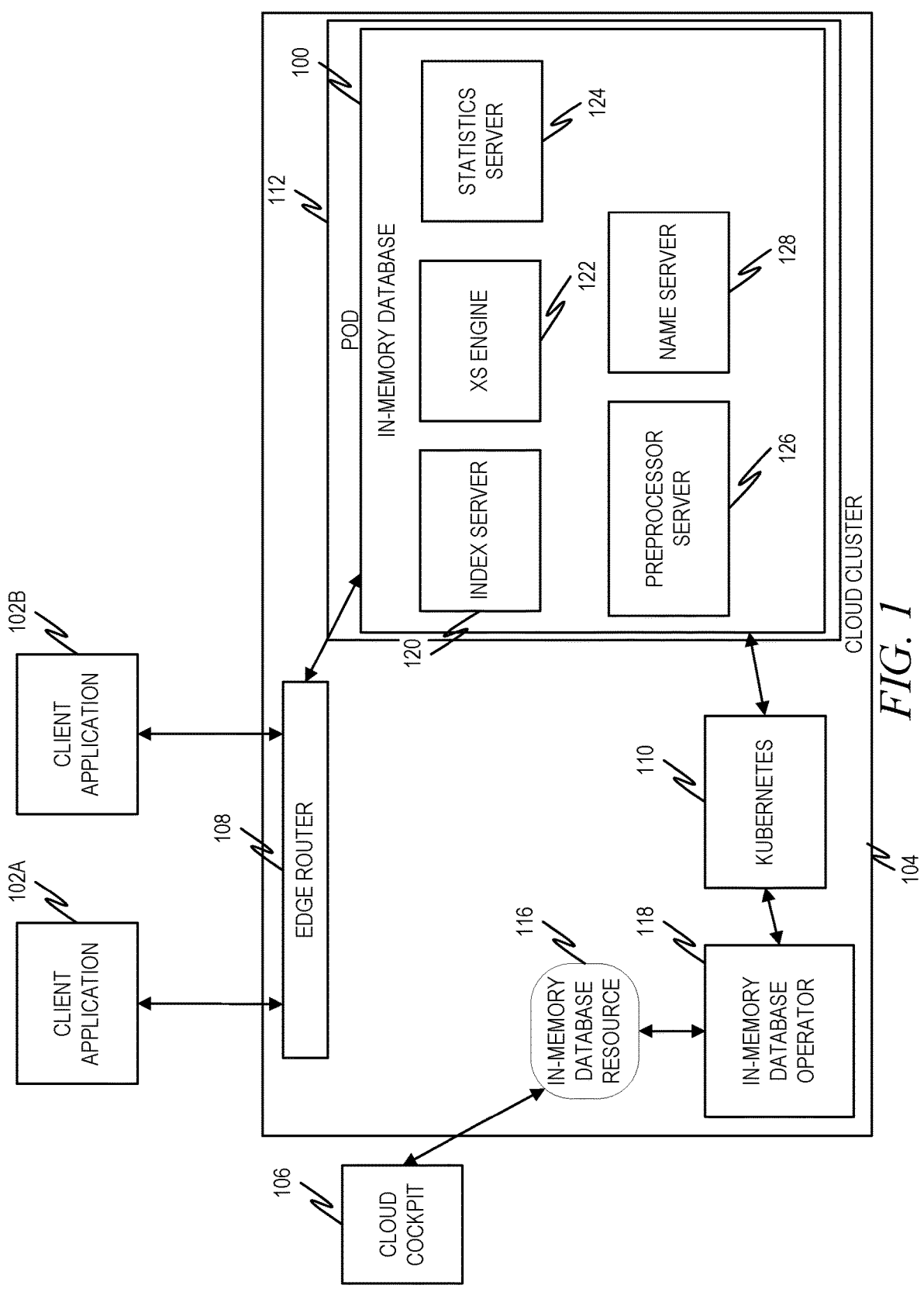
FIG. 1 is a diagram illustrating a cloud-based in-memory database management system, including its client/external connection points, which can be kept stable in the case of disaster recovery to ensure stable service operations, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One implementation of in-memory databases is to place them in a cloud and allow access to the cloud database as a service. This allows customers to leverage the in-memory data processing and advanced analytic capabilities in the cloud.

Such services may allow applications to be developed using specialized in-memory database extended application services and deployed to a Cloud Foundry environment. Cloud Foundry is an open source, multi-cloud application platform as a service that allows for continuous delivery as it supports a full application development life cycle, from initial deployment through testing stages to deployment. Cloud Foundry utilizes a container-based architecture that runs an application in any programming language over a variety of cloud service providers.

A customer-facing application is provided as part of an in-memory database in a cloud environment. This customer-facing application allows a customer to request lifecycle actions on the in-memory database, such as database creation, deletion, schema updates, and so forth. An example of such a customer-facing application is Cloud Cockpit. Cloud Cockpit communicates its lifecycle requests to a service broker, which is a component located in an in-memory database cloud cluster. The service broker then interprets the requests and initiates the underlying database operation.

The customer-facing application provides a document known as a resource that describes how the instance of the in-memory database should be utilized. This may include specifying, for example, a size, which features should be enabled, what security parameters should be utilized (e.g., password), and so forth. The in-memory database operator then brings the instance into the state described in this resource.

Modern cloud infrastructure is built on large distributed systems that comprise a multitude of different physical and/or virtual resources. The software systems that are responsible for management and orchestration have to manage their state and the state of their resources in order to make decisions and to inform the different components about changes. The resources are often of a declarative nature in that they describe a current and desired state of a particular resource, on which other components (often cloud container infrastructure operator) then act autonomously.

In a Platform-as-a-Service offering a resource could, for, example, describe various technical configuration details of a customer database system. Such details may include, for example, database size, load balancing requirements, formatting requirements, etc. Other components that watch for changes in the configuration would then act upon the change and perform the necessary operations to, for example, increase the database system's size if the database size parameter is changed.

Keeping the state of the resources up to date and synchronized across the system is an important task to keep the system in a consistent and healthy state. It is further important that all components in the system have access to the system's state.

Storing these details in a traditional database or data store has several downsides, however. Firstly, disruptions of the backing datastore can have massive impacts on the services running in the system, such as outages that affect operations of customers, incorrect configurations, and missing data due to lost events. Secondly, the database or data store that stores the details can experience total failures, due to events such as database corruption, or a scenario called "split brain", which occurs when a cluster of nodes gets divided into smaller clusters, each of which believes it is the only active cluster. Thirdly, in large systems, the load on the database and/or data store storing the details of the resources can become massive, especially if queries are not optimized, resulting in the database and/or data store being overladed or slow.

A solution such as ETCD, which is an open source, distributed, consistent key-value store for shared configuration, service discovery, and scheduler coordination of distributed systems or clusters of machines, can be implemented in a container orchestration system, such as Kubernetes™. With an ETCD solution, the database containing the resource details can be distributed among two or three ETCD databases, but this does not address the aforementioned technical challenges.

In an example embodiment, rather than use a traditional database or datastore, or an ETCD database, to store the state of a cloud infrastructure management and orchestration system, a peer-to-peer network is used. The complete state of the cluster is available at every node. Nodes that are newly added to the system will fetch the current state from existing nodes.

The overall state of the cluster comprises multiple small resources. A block is a unit that is verified in a consensus algorithm and potentially written into a blockchain (which denotes the state). Each block has a unique identifier and references one or more resources. In some example embodiments, a single block may have hundreds of resources. A resource contains specific information about a particular component or configuration in the environment, such as:

```
resource-id: af2391289
block-id" 39fa0sf38-3289
status:
    attribute_1: ...
    attribute_2: ...
desired state:
    key 1: {
        ...}
    key 2: {
        ...}
```

Blocks are immutable—changes to information stored in a block are performed by creating a new block containing the changed information. This allows for increased security and better debugging characteristics. Changes to the cluster caused by adding blocks utilize verification from a majority of the nodes (called quorum). Each node performs a verification of the newly added block. The distributed verification process may be conducted using a consensus algorithm that ensures the validity of the block.

If the verification of the block is successfully performed by at least a quorum of the nodes, then the block is persisted as a new state on a node, and then distributed as a new state to every other node. The verification ensures that errors, or possibly compromised nodes, cannot persist incorrect changes to the system state.

Every node then keeps the complete state of the resources in the cluster. This has several technical benefits. Firstly, individual node failures do not endanger the availability of information about the cluster state to other components. Secondly, large latency decreases because queries about the state of the cluster can be answered by a multitude of nodes (instead of a single database or database cluster), and even locally if the querying component is running on the node itself (thus not necessitating any network calls). Thirdly, state changes in the cluster are verified by a quorum of nodes before accepting them. This decreases the chances of misconfigurations and malicious components introducing errors into the system.

FIG. 1 is a diagram illustrating a cloud-based in-memory database 100, including its client/external connection points, which can be kept stable in the case of disaster recovery to ensure stable service operations, in accordance with an example embodiment. Here, the in-memory database 100 may be coupled to one or more client applications 102A, 102B. The client applications 102A, 102B may communicate with the in-memory database 100 through a number of different protocols, including Structured Query Language (SQL), Multidimensional Expressions (MDX), Hypertext Transfer Protocol (HTTP), REST, and Hypertext Markup Language (HTML).

The in-memory database 100 may be stored in cloud cluster 104. Also depicted is a cloud cockpit 106, used to perform lifecycle operations on the in-memory database 100. The one or more client applications 102A, 102B may access the in-memory database system via an edge router 108. On the back end, however, Kubernetes 110 is used to manage the specific instance of the in-memory database, which may be stored in a Kubernetes pod 112 or another container.

An in-memory database operator 118 may receive a request from the cloud cockpit 106 to create an instance of the in-memory database 100. This request may include, or at least reference, an in-memory database resource 116 which specifies one or more requirements of the in-memory database 100. The in-memory database operator 118 may then interface with Kubernetes 110 to create the in-memory database 100 in the pod 112. More particularly, the in-memory database resource may be established by a service broker application program interface (API).

The in-memory database 100 may comprise a number of different components, including an index server 120, an XS engine 122, a statistics server 124, a preprocessor server 126, and a name server 128. These components may operate on a single computing device or may be spread among multiple computing devices (e.g., separate servers).

The index server 120 contains the actual data and the engines for processing the data. It also coordinates and uses all the other servers. The XS engine 122 allows clients to connect to the in-memory database 100 using web protocols. The statistics server 124 collects information about status, performance, and resource consumption from all the other server components. The statistics server 124 can be accessed from the cloud cockpit 106 to obtain the status of various alert monitors. The preprocessor server 126 is used for analyzing text data and extracting the information on which text search capabilities are based. The name server 128 holds information about the database topology. This is used in a distributed system with instances of the database on different hosts. The name server 128 knows where the components are running, and which data is located on which server.

Figure 2:
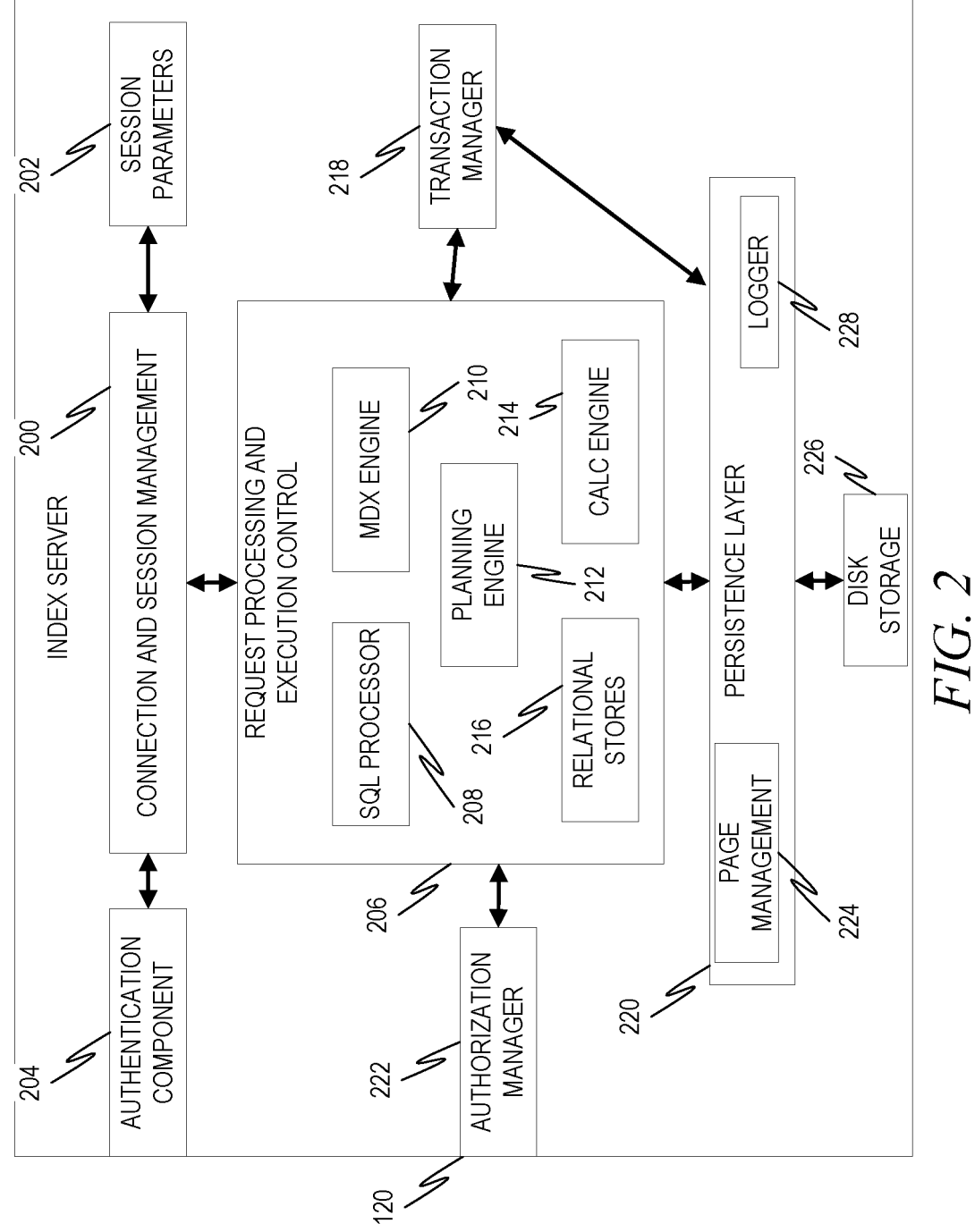
FIG. 2 is a diagram illustrating an index server, in accordance with an example embodiment.

FIG. 2 is a diagram illustrating an index server 120, in accordance with an example embodiment. Specifically, the index server 120 of FIG. 1 is depicted in more detail. The index server 120 includes a connection and session management component 200, which is responsible for creating and managing sessions and connections for the database clients. Once a session is established, clients can communicate with the database system using SQL statements. For each session, a set of session parameters 202 may be maintained, such as auto-commit, current transaction isolation level, and so forth. Users (e.g., system administrators, developers) may be authenticated by the database system itself (e.g., by logging in with username and password, using an authentication component 204), or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. MDX are a language for querying and manipulating multidimensional data stored in online analytical processing (OLAP) cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL scripts, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database system components to check whether the user has the specified privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to and from a separate disk storage 226, and also contains a logger 228 that manages the transaction log. Log entries can be written implicitly by the persistence layer 220 when data is written via the persistence interface or explicitly by using a log interface.

Figure 3:
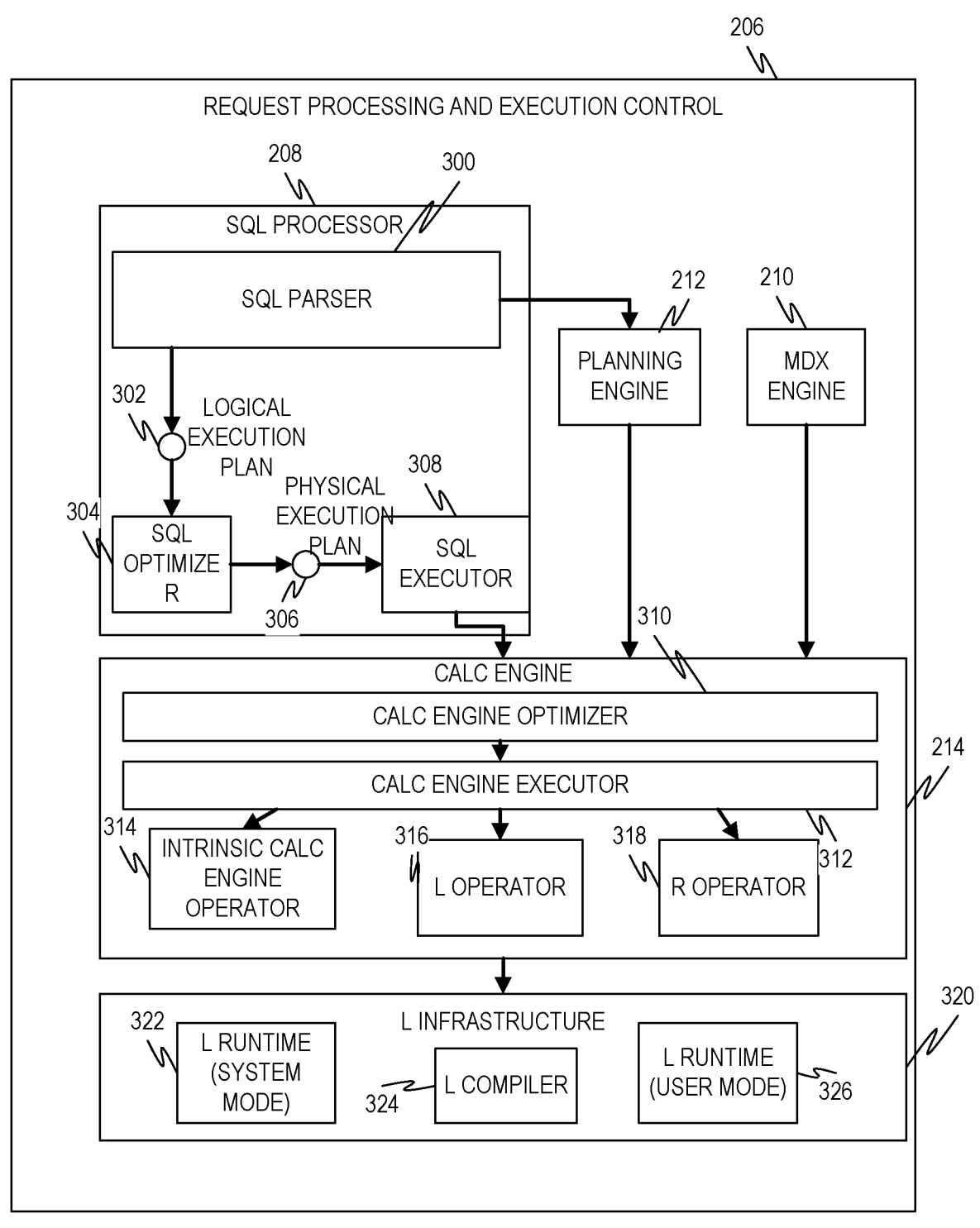
FIG. 3 is a diagram illustrating a request processing and execution control, in accordance with an example embodiment.

FIG. 3 is a diagram illustrating a request processing and execution control 206, in accordance with an example embodiment. This diagram depicts the request processing and execution control 206 of FIG. 2 in more detail. The SQL processor 208 contains an SQL parser 300, which parses an SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calc engine 214 implements the various SQL script and planning operations, and includes a calc engine optimizer 310, which optimizes the operations, a calc engine executor 312, which executes the operations, and an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (user mode) 326.

As described earlier, the in-memory database operator 118 of FIG. 1 acts to create the instance of the in-memory database in a Kubernetes pod. As part of this creation process, the requirements specified in the in-memory database resource 114 of FIG. 1 must be met. In order to verify that these requirements are met, even in situations where the requirements may be dependent upon other requirements being met, a series of component handlers may be executed.

Each component handler is a separate function that is modular in nature, in that a component handler can be swapped out with another component handler. While these component handlers may be separate, the requirements that they are validating may be dependent on requirements from other component handlers. In order to address this, in an example embodiment, an iterative process is used to execute the component handlers.

More particularly, a main function in the in-memory database operator 118 watches the Cloud Cluster 104. If it detects that a resource gets created, deleted, or modified, it calls a reconcile function. The reconcile function then detects a state of the instance of the in-memory database (if available) and tries to create (or modify) an instance of the in-memory database so that the instance meets the requirements in the in-memory database resource 116. Then each defined component handler is executed. It should be noted that each component handler has one or more conditions upon which it is supposed to act (or not act). Thus, it is possible that not all component handlers will actually fire when executed if their conditions indicate that they should not. For purposes of these documents, this will still be considered to be a component handler "executing," even if that execution stops at the determination that the conditions for firing have not been met. It should be noted that in an example embodiment, the check of the conditions is executed by each component handler individually, thus decoupling them. Once a component handler fires and completes execution, it can report back that it is successful, and it will not need to run again in a subsequent iteration. All the component handlers are executed in the first iteration, and any component handlers that do not report back as successful are then executed in the second iteration. This process repeats until all component handlers are successful.

Figure 4:
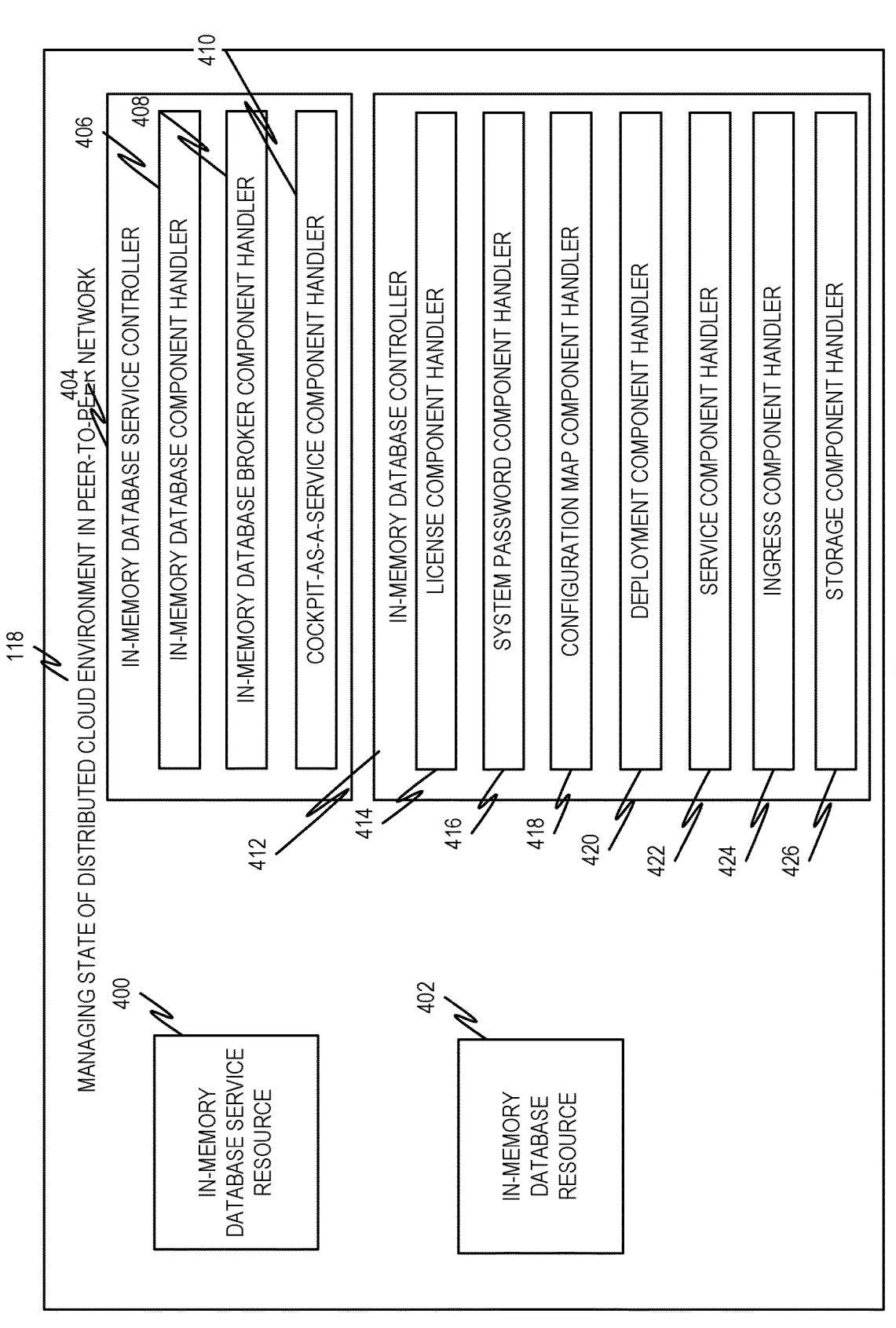
FIG. 4 is a block diagram illustrating an in-memory database operator, in accordance with an example embodiment.

The in-memory database operator 118 comprises multiple controllers of the same family. In this case, the family is controllers related to an in-memory database 100. FIG. 4 is a block diagram illustrating an in-memory database operator 118, in accordance with an example embodiment. Here, the in-memory database operator 118 comprises two resources: an in-memory database service resource 400 and an in-memory database resource 402. The in-memory database service resource 400 is a high-level abstracted resource containing only parameters that a customer sends to a landscape. Status messages on the resource are designed to be sent back to the customer to indicate the progress of operations on the instance of the in-memory database 100 or to communicate failures back. The status on this resource can be defined as a return-channel to the customer.

The in-memory database resource 402 is a low-level resource designed to represent the actual configuration, size, and location of the in-memory database 100 instance within the cloud cluster 104 (which is part of the landscape mentioned in the description of the in-memory database service resource 400)

Workflow within a controller in the in-memory database operator 118 follows a "reconcile" pattern. The pattern makes no assumptions about the environment surrounding the application but looks at the state of the world while working on one resource. This means that the whole application is stateless and computes its state when there is work (reconciliation) to do.

Thus, the controller does not need to recognize the difference between a creation, a modification, a periodic check, or a deletion. Indeed, the in-memory database operator 118 does not need to know whether the resource just got created, modified, or if the current call is just a periodic check for the health of the system. The whole process operating on a given resource is simply called a reconciliation.

In order to simplify some of the internal workings of the in-memory database operator 118, in an example embodiment, smaller controllers that perform only a single dedicated task are implemented. These single-task controllers are called "component handlers."

All component handlers are resilient against several failures that could occur during runtime, such as network outages, program crashes, permission issues, and other errors. This is accomplished by retrying the operation of the component handler again until it succeeds. If an operation is not finished, unable to be performed, or returns an error, the entire reconcile function requeues the request for another reconciliation of the resource. The in-memory database operator 118 implements exponential back-offs so that the reconcilers will wait exponentially longer after each failure to increase the chances of being successful without stressing the system.

An in-memory database service controller 404 watches all in-memory database resources 402 in a given cluster. When it detects a change, such as a creation, modification, or deletion, it triggers a new reconciliation run. Because a reconciliation run is stateless, it must first get the affected instance by querying an API for Kubernetes 110 for the resource. Afterwards, every min-reconciler is instantiated and sequentially called (in no particular order, as the pattern of not making assumptions about the surrounding environment applies here as well). In an example embodiment, the in-memory database service controller 404 contains the following component handlers: in-memory database component handler 406, in-memory database broker component handler 408, and cockpit-as-a-service component handler 410.

The in-memory database component handler 406 creates an instance of the in-memory database 100 by transforming the customer's request to more detailed, low-level directives that are then picked up by an in-memory database controller 412. When called, the in-memory database component handler 406 tries to find a matching in-memory database source (by trying to obtain it using the same name as the in-memory database service resource 400). If the component handler is unable to retrieve the desired resource, it creates the in-memory database resource 402. If the in-memory database resource 402 is available but not in the desired state, it places the in-memory database resource 402 in the desired state.

The in-memory database broker component handler 406 registers the in-memory database 100 instance to a broker within the cloud cluster 104 so that a customer can create applications based on the in-memory database 100 instance.

As a prerequisite, the underlying in-memory database resource 116 needs to indicate that it is ready.

The cockpit-as-a-service component handler 410 registers the in-memory database 100 instance to a cockpit-as-a-service program. As a prerequisite, the underlying in-memory database resource 116 needs to indicate that it is ready.

In an example embodiment, the in-memory database controller 412 contains the following component handlers: a license component handler 414, a system password component handler 416, a configuration map component handler 418, a deployment component handler 420, a service component handler 422, an ingress component handler 424, and a storage component handler 426.

The license component handler 414 configures the license of the in-memory database 100 instance so that it can be continued to be used by the customer. As a prerequisite, the underlying in-memory database resource 116 needs to indicate that its system database is available and accepts connections.

The system password component handler 416 changes the system password of the tenant database of the customer to the password specified by the customer. As a prerequisite, the in-memory database resource 116 needs to indicate that it is ready.

The configuration map component handler 418 creates a Kubernetes configuration map, which contains the configuration of the in-memory database 100 instance. When called by the reconciler, this component handler tries to find a matching configuration map resource (using the same name as the in-memory database resource 116). If the reconciler is unable to retrieve the desired resource, it creates the configuration map.

The deployment component handler 420 creates a Kubernetes deployment, which results in a pod 112 that will eventually hold the running in-memory database 100 instance. When called, the reconciler tries to find a matching deployment resource (using the same name as the in-memory database resource 116). If the reconciler is unable to retrieve the desired resource, it creates the deployment.

The service component handler 422 creates a cluster-internal service so that the in-memory database 100 instance is reachable within the cloud cluster 104. When called, the reconciler tries to find a matching service resource (using same name as the in-memory database resource 116). If the reconciler is unable to retrieve the desired resource, it creates the service.

The ingress component handler 424 creates a Kubernetes ingress with a given fully qualified domain name for external access from the customer. When called, the reconciler tries to find a matching service resource (using the same name as the in-memory database resource 116). If the reconciler is unable to retrieve the desired resource, it creates the ingress. Additionally, specified Internet Protocol (IP) ranges from the customer are passed to the ingress object. With this, the customer can whitelist traffic. The reconciler adds internal IP ranges that the service needs to communicate with the cloud platform.

The storage component handler 426 creates a storage in the form of a volume that holds the data of the in-memory database instance, in encrypted format. When called, the reconciler tries to find a matching volume resource (using the same name as the in-memory database resource 116). If the reconciler is unable to retrieve the desired resource, it creates the volume.

Figure 5:
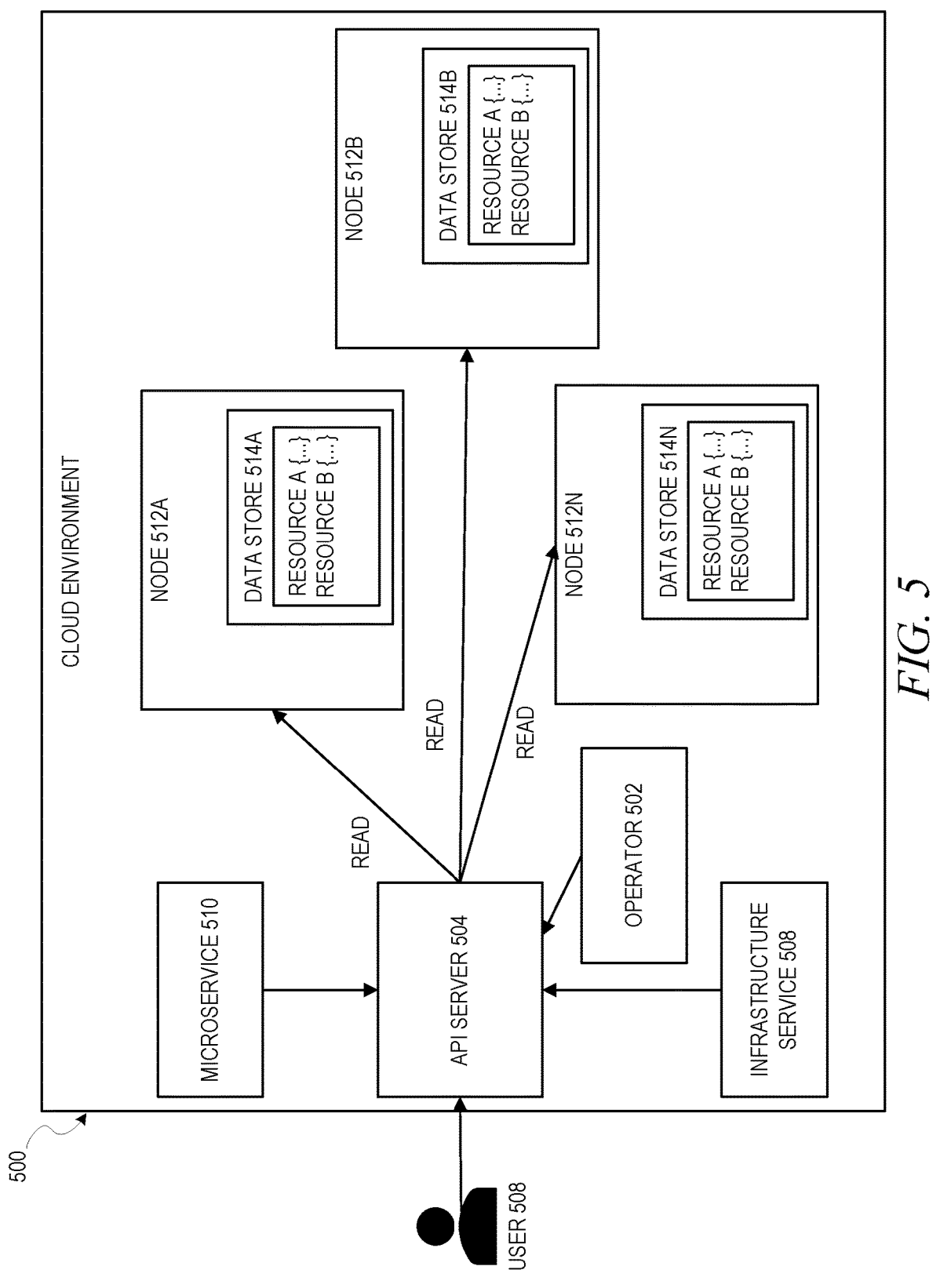
FIG. 5 is a block diagram illustrating an architecture of a cloud environment during a read process, in accordance with an example embodiment.

FIG. 5 is a block diagram illustrating an architecture of a cloud environment 500 during a read process, in accordance with an example embodiment. Here, operator 502 may be, for example, a Kubernetes™ operator, such as the in-memory database operator 118 of FIG. 1, although it is not necessary that the operator 502 be an in-memory database operator, or even generally a database operator, as embodiments are possible where the operator 502 is a non-database operator.

A read operation may be received by an Application Program Interface (API) server 504 from any of the operator 502, an infrastructure service 506, a user 508, or a microservice 510. In this example, the read operation is an operation to read resource A and resource B. All registered nodes 512A-512N in the cloud environment 500 are distributed in a peer-to-peer network, and all maintain the complete state of the cloud environment, including resource A, and resource B. As such, the API server 504 is able to request the read operation be performed on any node 512A-510N. At each node 512A-512N, the resource information is stored in a corresponding data store 514A-514N

Figure 6:
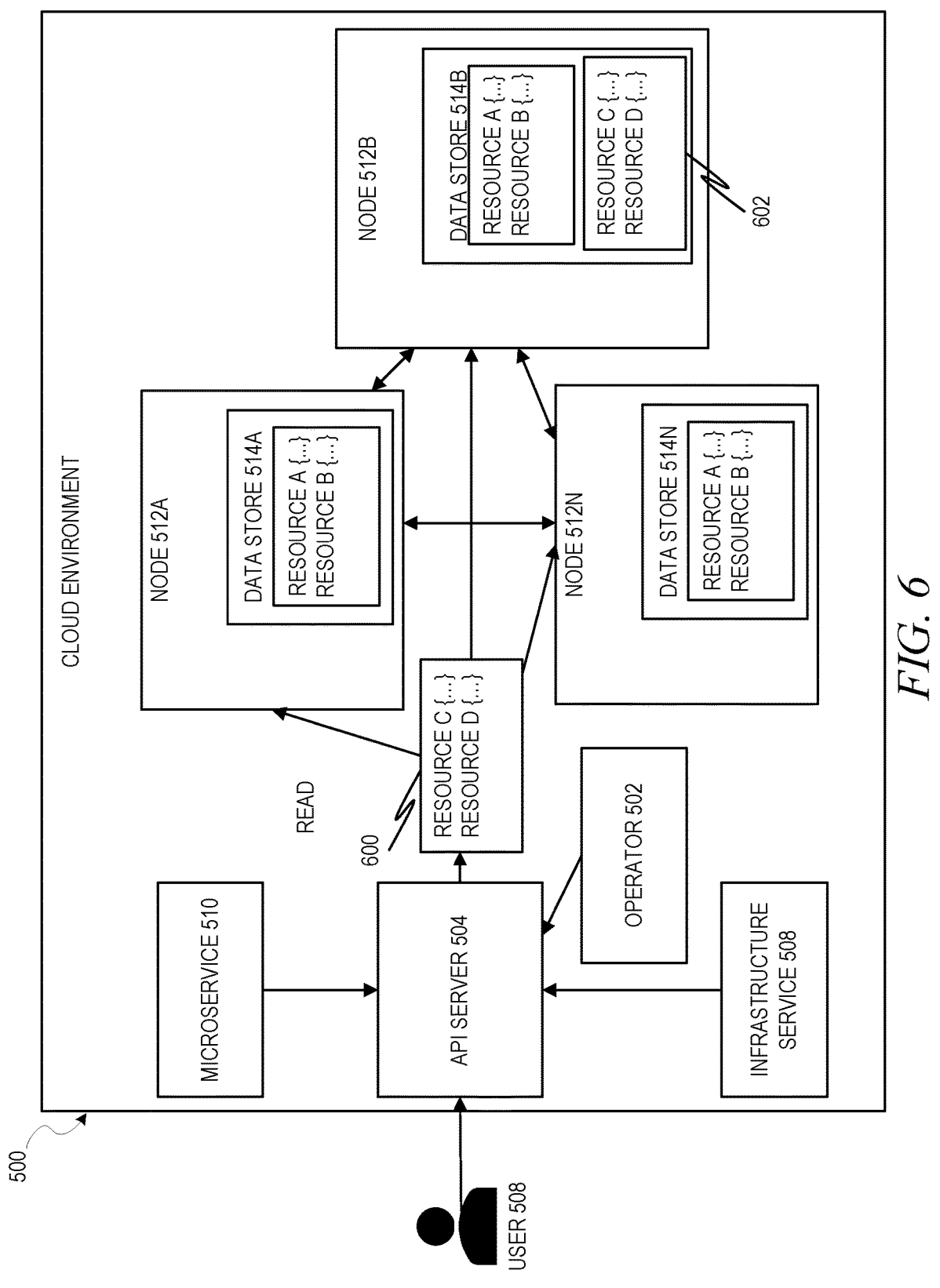
FIG. 6 is a block diagram illustrating an architecture of a cloud environment of FIG. 5 during a write process, in accordance with an example embodiment.

FIG. 6 is a block diagram illustrating an architecture of a cloud environment 500 of FIG. 5 during a write process, in accordance with an example embodiment. Any of operator 502, infrastructure service 506, user 508, or microservice 510 may request a resource creation. Here, for example, microservice 510 requests that resource C be created, while operator 502 requests that resource D be created. Thus, API server sends requests 600 that both resource C and resource D be created. These requests 600 from the API server are sent to all nodes 512A-512N. Each of the nodes then attempts to verify the requests 600.

Verification by each node 512A-512N may be performed in a number of different ways, depending upon implementation, and often depending upon whether speed or security is of upmost concern. For systems where speed is of upmost concern, the verification may be high-level, such as determining whether the syntax of the resource information is syntactically correct, whether the range of values in the parameters of the resource information meets certain guidelines, whether the format of the resource information is correct, and whether a particular change in the resource is permitted. For systems where security is of upmost concern, the verification may be deeper, such as examining the underlying application to determine whether the resource change is even possible with the current state of the application, and verifying whether the request to make the change was actually received from the API server 504. In an example embodiment, the level of verification may be configurable, and in some example embodiments may be dynamically determined based on runtime factors.

The term "quorum" in this context refers to a set minimum limit on the number of nodes 512A-512N that need to verify the block before it is allowed to be written. In an example embodiment, this minimum limit may be set at a majority of the nodes (e.g., at least 50.00001% of the nodes), or in most scenarios, at least one node more than half of all the nodes.

The mechanism by which this verification occurs can also vary based on implementation. In one example embodiment, a consensus algorithm may be performed. Consensus algorithms may include, for example, proof-of-work (PoW), proof-of-stake (PoS), delegated proof-of-stake (DPos), and Proof-of Authority (PoA).

PoW requires a not insufficient but feasible amount of effort by each node to perform the verification, in order to deter frivolous or malicious users. PoS require nodes 512A-512N to hold and stake something of value, such as tokens, for the privilege of performing the verification. DPoS is similar to PoS, except that stakeholders use their tokens to vote on delegates to perform the verifications. PoA allows nodes 512A-512N to earn the right to become verifiers.

Additionally, the consensus algorithm may additionally select one node 512A-512N to be the "leader" node. The leader node is the node that will be initially writing a block 602 containing the requests 600 to its local data store, which will then be synchronized with the other nodes later. The non-leader nodes may then be the ones performing the verification. Assuming at least a quorum of the non-leader nodes verifies the block, then the leader node writes the block locally.

Thus, for example, in FIG. 5, node 512B may be selected as the leader node, and thus it is depicted in FIG. 5 that node 512B stores the block 602 in its data store 514B upon a determination that at least a quorum number of the remaining nodes 512A—512N have verified the requests 600.

The synchronization can happen in a few different ways. In one example embodiment, the leader node publishes the block to the other nodes once it has completed writing it locally. In another example embodiment, a synchronization operation is periodically performed across all the nodes 512A-512N to synchronize the data stores of all the nodes.

As mentioned above, it is not necessary that the resources being written using the above-techniques be in-memory database resources, but they can be. In other example embodiments, any container infrastructure resources may be utilized. In some other example embodiments, the resources utilized may include custom-made resources, also known as custom resources (CRs), such as Kubernetes™ CRs. A Kubernetes™ custom resource definition (CRD) defines how a custom resource looks like (which parameters it has), so it is a blueprint for CRs that can be created later.

It should also be noted that in some example embodiments, the nodes 512A-512N are limited to nodes within a particular cluster, such as a particular Kubernetes™ cluster, thus differentiating them with other types of nodes that may exist outside of individual clusters, such as nodes on a blockchain.

Figure 7:
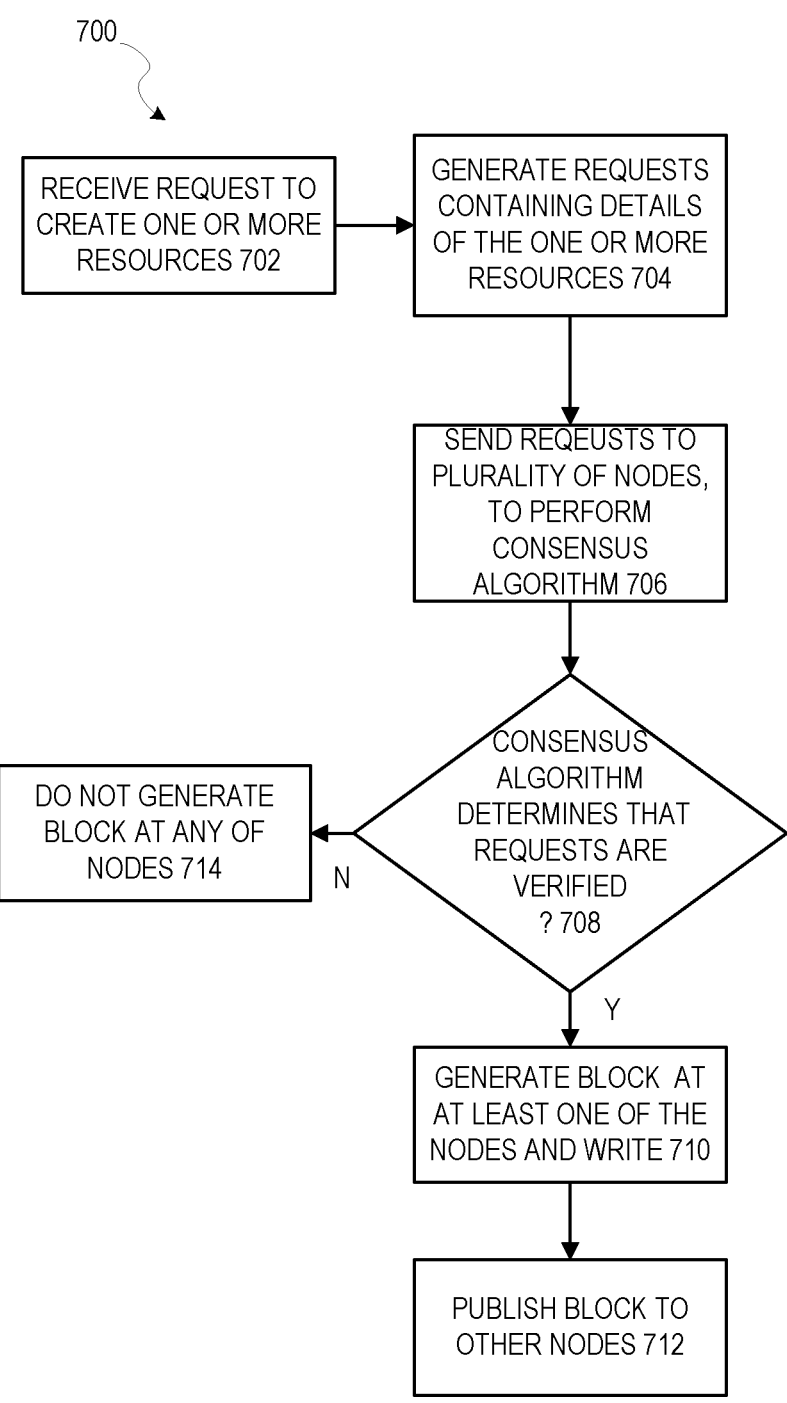
FIG. 7 is a flow diagram illustrating a method for writing a first resource in a container orchestration cluster, in accordance with an example embodiment.

FIG. 7 is a flow diagram illustrating a method 700 for writing a first resource in a container orchestration cluster, in accordance with an example embodiment. At operation 702, a request to create a first resource is received by a server in the container orchestration cluster. This request may be received from, for example, a microservice, user, operator (such as Kubernetes™ operator), or infrastructure service. The server may be, for example, an API server. At operation 704, one or more requests containing details of the one or more resources is generated.

At operation 706, the one or more resources is sent to a plurality of nodes in the cluster, the plurality of nodes each attempting to verify the one or more requests and utilizing a consensus algorithm to collectively determine whether the one or more requests has been verified. At operation 708, it is determined whether the one or more requests has been verified by the consensus algorithm. If so, then at operation 710, a block is generated for the one or more resources and is written to at least one of the nodes (e.g., a leader node). At operation 712, the block is then published to the other nodes. If at operation 708 it was determined that the requests are not verified, then at operation 714 no block is generated for the requests at any of the nodes.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:

at least one hardware processor; and a computer-readable medium storing instructions that, when executed by the at least one hardware processor, cause the at least one hardware processor to perform operations for operating an in-memory database operator within a container orchestrator, the operations comprising:

receiving, at a server in a cloud environment, a request to create one or more resources;

generating, at the server, one or more requests a first block containing details of the one or more resources;

sending the one or more requests from the server to a plurality of nodes in the cloud environment, the plurality of nodes each at least attempting to verify the one or more requests and utilizing a consensus algorithm to collectively determine whether the one or more requests has been verified; and generating a first block at a first node of the plurality of nodes based on a determination that the one or more requests has been verified by the consensus algorithm, the first block containing the details of the one or more resources.

Example 2. The system of Example 1, wherein the operations further comprise writing the first block to a remainder of the plurality of nodes based on the determination.

Example 3. The system of Examples 1 or 2, wherein the first node is selected as a leader node using the consensus algorithm.

Example 4. The system of any of Examples 1-3, wherein all of the nodes are within a single container infrastructure cluster.

Example 5. The system of any of Examples 1-4, wherein the first resource is a database resource.

Example 6. The system of Example 5, wherein the database resource is an in-memory database resource.

Example 7. The system of any of Examples 1-6, wherein the consensus algorithm is a proof-of-work consensus algorithm.

Example 8. A method comprising:

receiving, at a server in a cloud environment, a request to create one or more resources;

generating, at the server, one or more requests a first block containing details of the one or more resources;

sending the one or more requests from the server to a plurality of nodes in the cloud environment, the plurality of nodes each at least attempting to verify the one or more requests and utilizing a consensus algorithm to collectively determine whether the one or more requests has been verified; and generating a first block at a first node of the plurality of nodes based on a determination that the one or more requests has been verified by the consensus algorithm, the first block containing the details of the one or more resources.

Example 9. The method of Example 8, further comprising writing the first block to a remainder of the plurality of nodes based on the determination.

Example 10. The method of Example 8 or 9, wherein the first node is selected as a leader node using the consensus algorithm.

Example 11. The method of any of Examples 8-10, wherein all of the nodes are within a single container infrastructure cluster.

Example 12. The method of any of Examples 8-11, wherein the first resource is a database resource.

Example 13. The method of claim 12, wherein the database resource is an in-memory database resource.

Example 14. The method of any of Examples 8-13, wherein the consensus algorithm is a proof-of-work consensus algorithm.

Example 15. A non-transitory machine-readable medium storing instructions which, when executed by one or more processors, cause the one or more processors to perform operations comprising:

receiving, at a server in a cloud environment, a request to create one or more resources;

generating, at the server, one or more requests a first block containing details of the one or more resources;

sending the one or more requests from the server to a plurality of nodes in the cloud environment, the plurality of nodes each at least attempting to verify the one or more requests and utilizing a consensus algorithm to collectively determine whether the one or more requests has been verified; and generating a first block at a first node of the plurality of nodes based on a determination that the one or more requests has been verified by the consensus algorithm, the first block containing the details of the one or more resources.

Example 16. The non-transitory machine-readable medium of Example 15, wherein the operations further comprise writing the first block to a remainder of the plurality of nodes based on the determination.

Example 17. The non-transitory machine-readable medium of Example 15 or 16, wherein the first node is selected as a leader node using the consensus algorithm.

Example 18. The non-transitory machine-readable medium of any of Examples 15-17, wherein all of the nodes are within a single container infrastructure cluster.

Example 19. The non-transitory machine-readable medium of any of Examples 15-18, wherein the first resource is a database resource.

Example 20. The non-transitory machine-readable medium of Example 19, wherein the database resource is an in-memory database resource.

Figure 8:
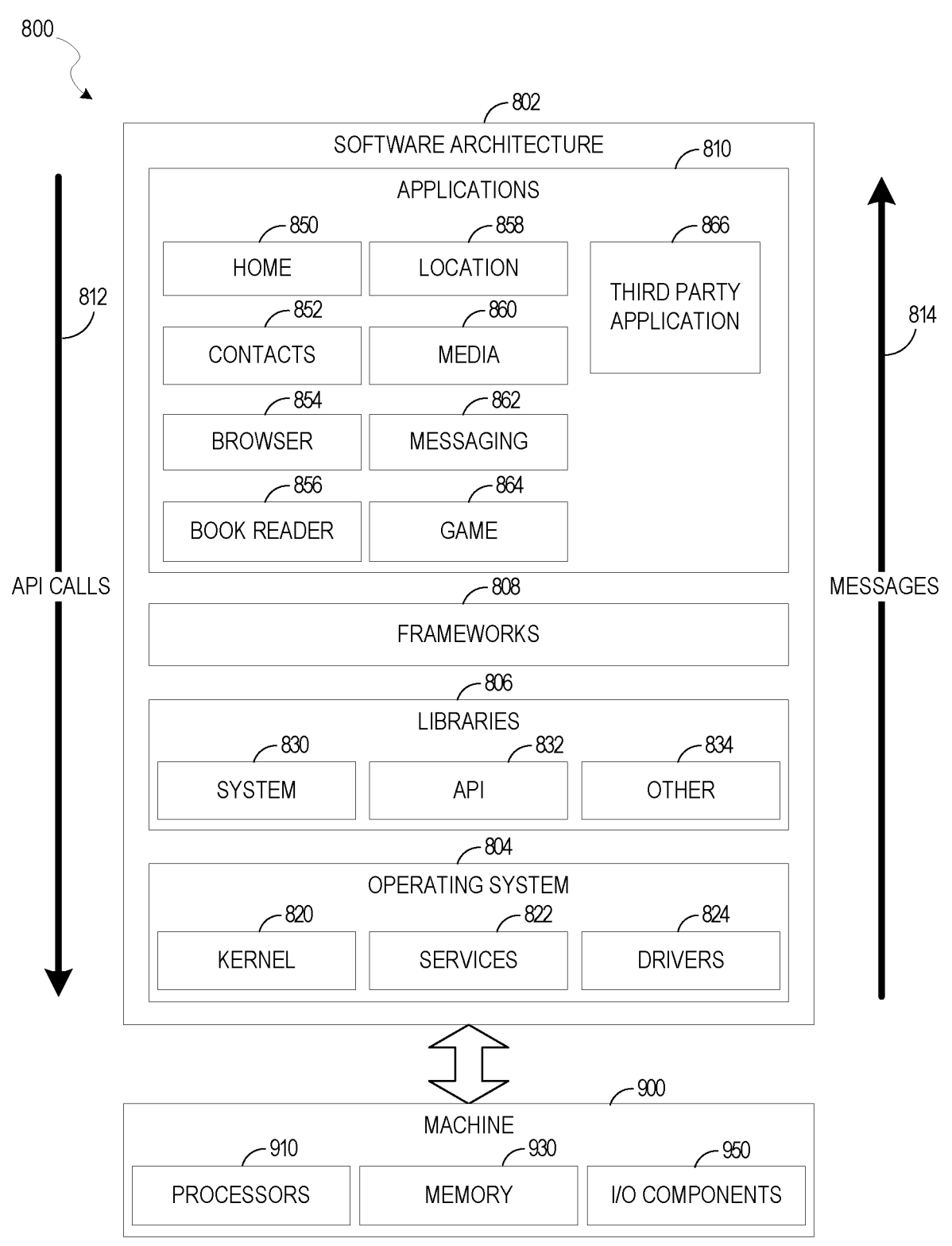
FIG. 8 is a block diagram illustrating an architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionalities. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
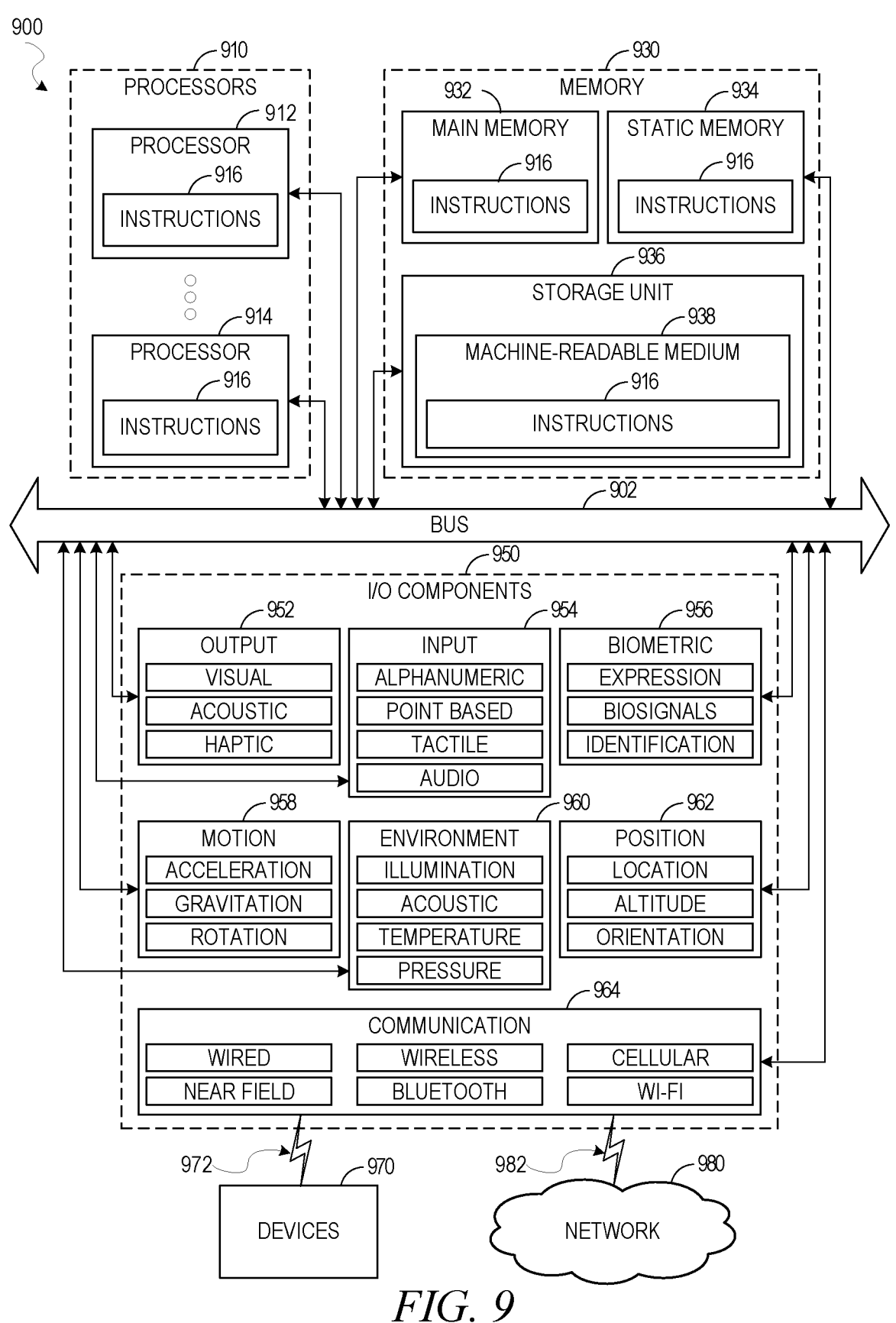
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via IP geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations for operating an in-memory database operator within a container orchestrator, the operations comprising:

receiving, at a server in a cloud environment, a request to create one or more resources, each of the one or more resources being a document that describes how one or more components of the cloud environment are utilized, the one or more components being software performing operations in the cloud environment;

generating, at the server, one or more requests containing details of the one or more resources;

sending the one or more requests from the server to a plurality of nodes in the cloud environment, the plurality of nodes each at least attempting to verify the one or more requests and utilizing a consensus algorithm to collectively determine whether the one or more requests has been verified; and generating a first block at a first node of the plurality of nodes based on a determination that the one or more requests has been verified by the consensus algorithm, the first block containing the details of the one or more resources.

2. The system of claim 1, wherein the operations further comprise writing the first block to a remainder of the plurality of nodes based on the determination.

3. The system of claim 1, wherein the first node is selected as a leader node using the consensus algorithm.

4. The system of claim 1, wherein all of the nodes are within a single container infrastructure cluster.

5. The system of claim 1, wherein the first resource is a database resource.

6. The system of claim 5, wherein the database resource is an in-memory database resource.

7. The system of claim 1, wherein the consensus algorithm is a proof-of-work consensus algorithm.

8. A method comprising:
receiving, at a server in a cloud environment, a request to create one or more resources, each of the one or more resources being a document that describes how one or more components of the cloud environment are utilized, the one or more components being software performing operations in the cloud environment;

generating, at the server, one or more requests containing details of the one or more resources;

sending the one or more requests from the server to a plurality of nodes in the cloud environment, the plurality of nodes each at least attempting to verify the one or more requests and utilizing a consensus algorithm to collectively determine whether the one or more requests has been verified; and generating a first block at a first node of the plurality of nodes based on a determination that the one or more requests has been verified by the consensus algorithm, the first block containing the details of the one or more resources.

9. The method of claim 8, further comprising writing the first block to a remainder of the plurality of nodes based on the determination.

10. The method of claim 8, wherein the first node is selected as a leader node using the consensus algorithm.

11. The method of claim 8, wherein all of the nodes are within a single container infrastructure cluster.

12. The method of claim 8, wherein the first resource is a database resource.

13. The method of claim 12, wherein the database resource is an in-memory database resource.

14. The method of claim 8, wherein the consensus algorithm is a proof-of-work consensus algorithm.

15. A non-transitory machine-readable medium storing instructions which, when executed by one or more processors, cause the one or more processors to perform operations comprising:

receiving, at a server in a cloud environment, a request to create one or more resources, each of the one or more resources being a document that describes how one or more components of the cloud environment are utilized, the one or more components being software performing operations in the cloud environment;

generating, at the server, one or more requests containing details of the one or more resources;

sending the one or more requests from the server to a plurality of nodes in the cloud environment, the plurality of nodes each at least attempting to verify the one or more requests and utilizing a consensus algorithm to collectively determine whether the one or more requests has been verified; and generating a first block at a first node of the plurality of nodes based on a determination that the one or more requests has been verified by the consensus algorithm, the first block containing the details of the one or more resources.

16. The non-transitory machine-readable medium of claim 15, wherein the operations further comprise writing the first block to a remainder of the plurality of nodes based on the determination.

17. The non-transitory machine-readable medium of claim 15, wherein the first node is selected as a leader node using the consensus algorithm.

18. The non-transitory machine-readable medium of claim 15, wherein all of the nodes are within a single container infrastructure cluster.

19. The non-transitory machine-readable medium of claim 15, wherein the first resource is a database resource.

20. The non-transitory machine-readable medium of claim 19, wherein the database resource is an in-memory database resource.

\* \* \* \* \*